(12) United States Patent
Kwon (10) Patent No.: US 11,176,772 B2
(45) Date of Patent: Nov. 16, 2021

(54) APPARATUS AND METHOD FOR CONTROLLING IMAGE DISPLAY DEVICE OF SLOT MACHINE APPARATUS

(71) Applicant: KORTEK CORPORATION, Incheon (KR)

(72) Inventor: Je Young Kwon, Anyang-si (KR)

(73) Assignee: KORTEK CORPORATION, Incheon (KR)

( * ) Notice: Subject to any disclaimer, the term of this patent is extended or adjusted under 35 U.S.C. 154(b) by 0 days.

(21) Appl. No.: 16/755,939

(22) PCT Filed: Aug. 29, 2018

(86) PCT No.: PCT/KR2018/009979
§ 371 (c)(1),
(2) Date: Apr. 14, 2020

(87) PCT Pub. No.: WO2019/088432
PCT Pub. Date: May 9, 2019

(65) Prior Publication Data
US 2020/0250919 A1    Aug. 6, 2020

(30) Foreign Application Priority Data

Oct. 30, 2017  (KR) ........................ 10-2017-0142773

(51) Int. Cl.
*G07F 17/32* (2006.01)
*G06F 16/483* (2019.01)

(52) U.S. Cl.
CPC ........ *G07F 17/3211* (2013.01); *G06F 16/483* (2019.01); *G07F 17/3227* (2013.01)

(58) Field of Classification Search
None
See application file for complete search history.

(56) References Cited

U.S. PATENT DOCUMENTS 5,974,235 A * 10/1999 Nunally ........... G08B 13/19604
                                                            709/202
10,083,639 B2 * 9/2018 Kimura ................ G02B 27/017
(Continued)

FOREIGN PATENT DOCUMENTS

KR    1020060014367 A    2/2006
KR    1020060094321 A    8/2006
(Continued)

OTHER PUBLICATIONS

International Search Report dated Nov. 29, 2018 for PCT/KR2018/009979.

*Primary Examiner* — Ronald Laneau
(74) *Attorney, Agent, or Firm* — Schmeiser, Olsen & Watts, LLP (57) ABSTRACT

An apparatus and method for controlling an image display device of a slot machine apparatus is provided. The apparatus includes an image storage unit configured to store at least one piece of image content to be displayed on an image display device of a slot machine apparatus, a data storage unit configured to store image setting data for optimizing a function of the image display device according to the nature or mode of the image content, a control unit configured to output specific image content of the image storage unit to a designated image display device or any display region of the image display device through an image output unit and configured to control image setting of the image display device using the image setting data in order to optimize image quality according to the nature or mode of the image content, and a communication unit.

11 Claims, 6 Drawing Sheets

(56) References Cited

U.S. PATENT DOCUMENTS

| | | | | |
|---|---|---|---|---|
| 2007/0280633 | A1* | 12/2007 | Nakamura | H04N 5/76 386/230 |
| 2012/0200592 | A1* | 8/2012 | Kimura | G02B 27/017 345/619 |
| 2013/0344955 | A1 | 12/2013 | Reddy et al. | |

FOREIGN PATENT DOCUMENTS

| | | |
|---|---|---|
| KR | 1020070007456 A | 1/2007 |
| KR | 1020070063740 A | 6/2007 |
| KR | 1020110038924 A | 4/2011 |

* cited by examiner

| | IMAGE NATURE | NECESSARY FUNCTIONS AND CONFIGURATION OF IMAGE DISPLAY DEVICE |
|---|---|---|
| DEMO MODE | BRILLIANT, SHAPE, DYNAMIC | - BRIGHTNESS (BLU CONTROL : HIGH)<br>- COLOR REPRODUCIBILITY (Color Gamut CONTROL : HIGH)<br>- SHARPNESS (Peaking, Sharpness CONTROL : HIGH)<br>- RESPONSE SPEED (Over Drive CONTROL : HIGH) |
| | BRILLIANT, SHAPE, STATIC | - BRIGHTNESS (BLU CONTROL : HIGH)<br>- COLOR REPRODUCIBILITY (Color Gamut CONTROL : HIGH)<br>- SHARPNESS (Peaking, Sharpness CONTROL : HIGH)<br>- RESPONSE SPEED (Over Drive CONTROL : LOW) |
| | IMAGE NATURE | NECESSARY FUNCTIONS AND CONFIGURATION OF IMAGE DISPLAY DEVICE |
| GAME MODE | BRILLIANT, SHAPE, DYNAMIC | - BRIGHTNESS (BLU CONTROL : LOW)<br>- COLOR REPRODUCIBILITY (Color Gamut CONTROL : LOW)<br>- SHARPNESS (Peaking, Sharpness CONTROL : LOW)<br>- RESPONSE SPEED (Over Drive CONTROL : HIGH) |
| | BRILLIANT, SHAPE, STATIC | - BRIGHTNESS (BLU CONTROL : LOW)<br>- COLOR REPRODUCIBILITY (Color Gamut CONTROL : LOW)<br>- SHARPNESS (Peaking, Sharpness CONTROL : LOW)<br>- RESPONSE SPEED (Over Drive CONTROL : LOW) |
| | IMAGE NATURE | NECESSARY FUNCTIONS AND CONFIGURATION OF IMAGE DISPLAY DEVICE |
| EVENT MODE | BRILLIANT, SHAPE, DYNAMIC | - BRIGHTNESS (BLU CONTROL : MIDDLE)<br>- COLOR REPRODUCIBILITY (Color Gamut CONTROL : MIDDLE)<br>- SHARPNESS (Peaking, Sharpness CONTROL : MIDDLE)<br>- RESPONSE SPEED (Over Drive CONTROL : MIDDLE) |
| | BRILLIANT, SHAPE, STATIC | - BRIGHTNESS (BLU CONTROL : MIDDLE)<br>- COLOR REPRODUCIBILITY (Color Gamut CONTROL : MIDDLE)<br>- SHARPNESS (Peaking, Sharpness CONTROL : MIDDLE)<br>- RESPONSE SPEED (Over Drive CONTROL : LOW) |

APPARATUS AND METHOD FOR CONTROLLING IMAGE DISPLAY DEVICE OF SLOT MACHINE APPARATUS

CROSS-REFERENCE TO RELATED APPLICATIONS

This application claims priority to PCT Application No. PCT/KR2018/009979, having a filing date of Aug. 29, 2018, based on KR 10-2017-0142773, having a filing date of Oct. 30, 2017, the entire contents both of which are hereby incorporated by reference.

FIELD OF TECHNOLOGY

The following relates to an apparatus and method for controlling an image display device of a slot machine apparatus, and more particularly, to an apparatus and method for controlling an image display device of a slot machine apparatus to automatically control image settings related to the image quality of the image display device according to the nature or mode of image content output from the slot machine apparatus.

BACKGROUND

In general, a conventional image display device provided for slot machine apparatuses is continuously used according to image settings (e.g., backlight, contrast, brightness, sharpness, color depth, color, color temperature, black level, gamma, overdrive, noise reduction, etc.) configured by default when shipped from the factory.

Thus, the image display device operates independently regardless of the nature or mode of content (i.e., the image display device is operated only at the initially set image quality regardless of the nature or mode of the content), and thus has a limitation in expressing the image quality of produced content depending on the purpose (e.g., demo, game, event, etc.).

In addition, recently, an image display device with high brightness and high color reproducibility (i.e., an image display device with improved color display performance) has been widely used. Rather, however, when the image display device continues to operate with high brightness, the user quickly experiences eye fatigue. Also, when a light source continues to operate with a value close to the maximum brightness of the output of the light source, the lifespan of the image display device is drastically reduced. Also, when the image display device continues to operate with high color reproducibility, a user may become insensitive to the advantages of the high color reproducibility.

In addition, functions related to the image quality of an image scaler used in an image display device are becoming more and more diverse. However, since most slot machines continue to operate with the same setting values, the effects of the functions related to the image quality are not maximized. Rather, side effects appear due to the functions related to the image quality.

For example, the overdrive function is to solve an image persistence problem occurring for a motion image. However, when the overdrive is set excessively, side effects such as a reverse image persistence problem may occur, and also, the lifespan of the panel of the image display device may be reduced. Also, when a light source continues to operate with a value close to the maximum brightness of the light source, the lifespan of the light source is rapidly decreased.

Also, multiple (e.g., at least three) image display devices are installed and operated in one slot machine apparatus. In this case, each image display device does not perform its desired function or effect properly because the image display devices are operated with the same image settings even though the nature or mode of content displayed on each image display device is different from those of other image display devices.

Also, images with different natures or modes may be contained in one piece of content displayed on one image display device provided in a slot machine apparatus (e.g., 3-minute image content is formed by mixing a 1-minute text video, a 1-minute brilliant action video, and a 1-minute guide video). In this case, when the function of the image display device is set with respect to only one characteristic, a side effect may occur in portions with different characteristics.

The background of embodiments of the present invention is disclosed in Korean Patent Application Publication No. 10-2006-0014367 (entitled "Slot Machine" and published on Feb. 15, 2006).

SUMMARY

An aspect relates to an apparatus and method for controlling an image display device of a slot machine apparatus to automatically control image setting related to the image quality of the image display device according to the nature or mode of image content output from the slot machine apparatus.

According to an aspect of embodiments of the present invention, an apparatus for controlling an image display device of a slot machine apparatus includes an image storage unit configured to store at least one piece of image content to be displayed on the image display device of the slot machine apparatus; a data storage unit configured to store image setting data for optimizing a function of the image display device according to the nature or mode of the image content; a control unit configured to output specific image content of the image storage unit to a designated image display device or at least one display region of the image display device through an image output unit and configured to control image setting of the image display device or the at least one display region of the image display device using the image setting data in order to optimize image quality according to the nature or mode of the image content; and a communication unit configured to transmit a control signal of the control unit, which controls the image setting of the image display device, to the image display device or configured to deliver specification information related an image setting function and range of the image display device to the control unit.

According to embodiments of the present invention, when the slot machine is equipped with one or more image display devices, the control unit identifies the image display devices on the basis of an ID which is used to identify each image display device or an image output port to which each image display device is connected.

According to embodiments of the present invention, the image display device is implemented to support at least two or more multimedia window functions, output a different piece of image content to each window, and apply image setting for representing different image quality to each window.

According to embodiments of the present invention, the data storage unit stores at least one set of image setting data in order to correspond to at least one or more image display devices according to the nature or mode of the same image content.

According to embodiments of the present invention, the control unit is configured to check specification information related to an image setting function and range of an image display device from the image display device; read the image content from the image storage unit to analyze the nature or mode; and write a mapping database of the image setting data for image setting within the function and range of the image display device and the analyzed image content.

According to embodiments of the present invention, the mapping database is a database for the image setting or function of the image display device to represent the optimal image quality according to the nature or mode of the image content.

According to embodiments of the present invention, the control unit is configured to control the image setting or function of the image display device to optimize image quality according to the image content based on the written mapping database and is configured to output the image content to the image display device on which the image setting is performed.

According to embodiments of the present invention, the control unit is configured to control the image setting or function of the image display device according to a mapping database set in the analyzed current mode to optimize the image quality according to the image content when the nature or mode of the image content is analyzed, and is configured to transmit the image content after optimizing the image quality of the image display device according to the image content.

According to embodiments of the present invention, the image setting is manually done by a user.

According to embodiments of the present invention, a method of controlling an image display device of a slot machine apparatus includes causing a control unit to check specification information related to an image setting function and range of the image display device from the image display device, causing the control unit to read image content from an image storage unit and analyze the nature or mode of the image content, causing the control unit to write a mapping database of image setting data for image setting within a function and range of the image display device and the analyzed image content, causing the control unit to control the image setting or function of the image display device to optimize image quality according to the image content based ono the written mapping database, and causing the control unit to output the image content to the image display device on which the image setting is performed.

According to embodiments of the present invention, the controlling of the image setting or function of the image display device to optimize image quality according to the image content according to the written mapping database includes causing the control unit to control the image setting or function of the image display device to optimize image quality according to the image content according to a mapping database set in the analyzed mode when the nature or mode of the image content is analyzed.

According to embodiments of the present invention, the mapping database is a database for the image setting or function of the image display device to represent the optimal image quality according to the nature or mode of the image content.

According to embodiments of the present invention, the image setting data includes at least one set of image setting data in order to correspond to at least one or more image display devices according to the nature or mode of the same image content.

According to an aspect of embodiments of the present invention, by automatically controlling the image setting related to the image quality of the image display device according to the nature or mode of the image content output from the slot machine, it is possible to provide a user with more comfortable images optimized for the content, various colorful images, or images with better image quality closer to their original images, and it is also possible to extend the lifespan of the image display device.

BRIEF DESCRIPTION

Some of the embodiments will be described in detail, with reference to the following figures, wherein like designations denote like members, wherein.

DETAILED DESCRIPTION

Hereinafter, an embodiment of an apparatus and method for controlling an image display device of a slot machine apparatus according to embodiments of the present invention will be described with reference to the accompanying drawings.

In the drawings, thicknesses of lines or sizes of elements may be exaggerated for clarity and convenience. Also, the following terms are defined considering functions of embodiments of the present invention and may be differently defined depending on a user, the intent of an operator, or a custom. Therefore, the terms should be defined based on the overall contents of the specification.

Figure 1:
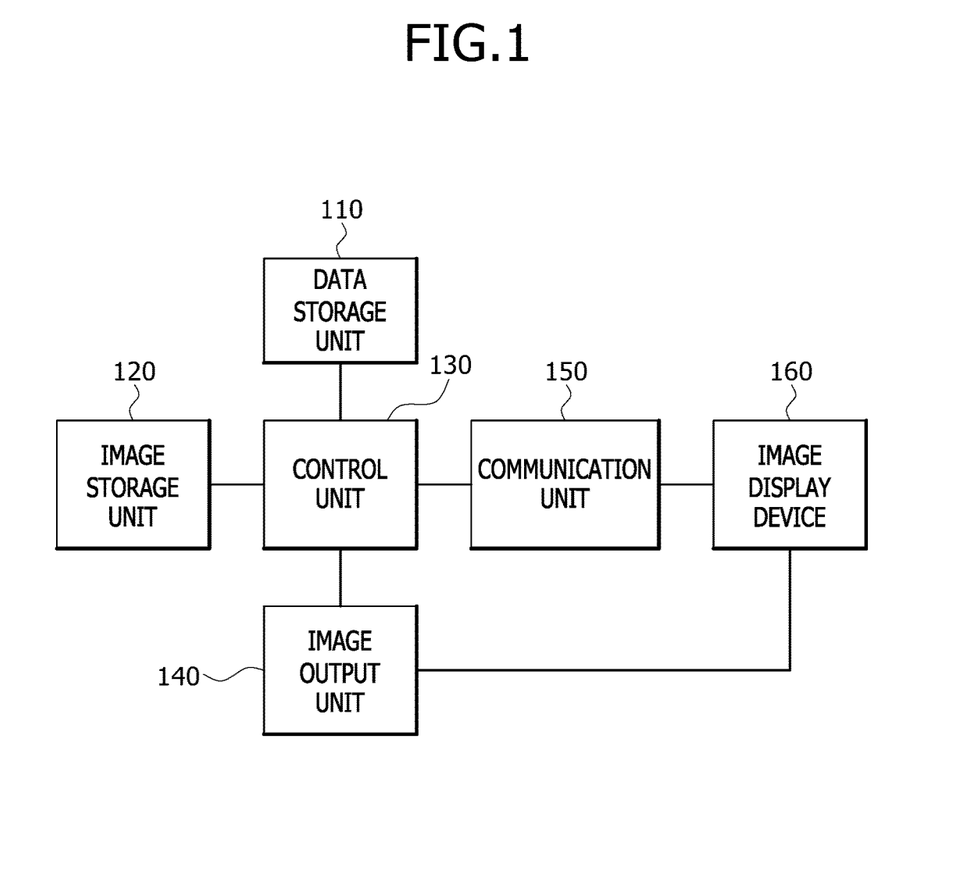
FIG. 1 is an exemplary diagram showing a schematic configuration of an apparatus for controlling an image display device of a slot machine apparatus according to a first embodiment of the present invention.

FIG. 1 is an exemplary diagram showing a schematic configuration of an apparatus for controlling an image display device of a slot machine apparatus according to a first embodiment of the present invention.

As shown in FIG. 1, the apparatus for controlling the image display device of the slot machine apparatus according to the first embodiment of the present invention includes a data storage unit 110, an image storage unit 120, a control unit 130, an image output unit 140, a communication unit 150, and an image display device 160.

The data storage unit 110 stores image setting data for optimizing the function of the image display device 160 to correspond to the nature or mode of image content stored in the image storage unit 120.

The data storage unit 110 may store at least one set of image setting data for the nature or mode of the same image content. This is because the performance or function of the image display device 160 may not correspond to the image setting data. That is, since the image display device 160 has various supportable performances or functions depending on the manufacturer, at least one set of image setting data may be provided according to the performances or functions.

The image storage unit 120 stores at least one piece of image content to be displayed on the image display device of the slot machine apparatus.

In this case, the slot machine apparatus may be operated while multiple (e.g., at least two) image display devices are installed or while the display region of the image display device is divided into at least two display regions (or image display units). The control unit 130 outputs specific image content of the image storage unit 120 to a designated image display device 160 through the image output unit 140.

For example, when at least two image display devices 160 are installed and operated or when at least two display regions are operated, the control unit 130 outputs and displays image content stored in the image storage unit 120 to and on at least one image display device or at least one display region. Here, an image display device or a display region for outputting the image content may be pre-designated.

In this case, at least two image output units 140 and at least two image display devices 160 may be included.

Figure 4:
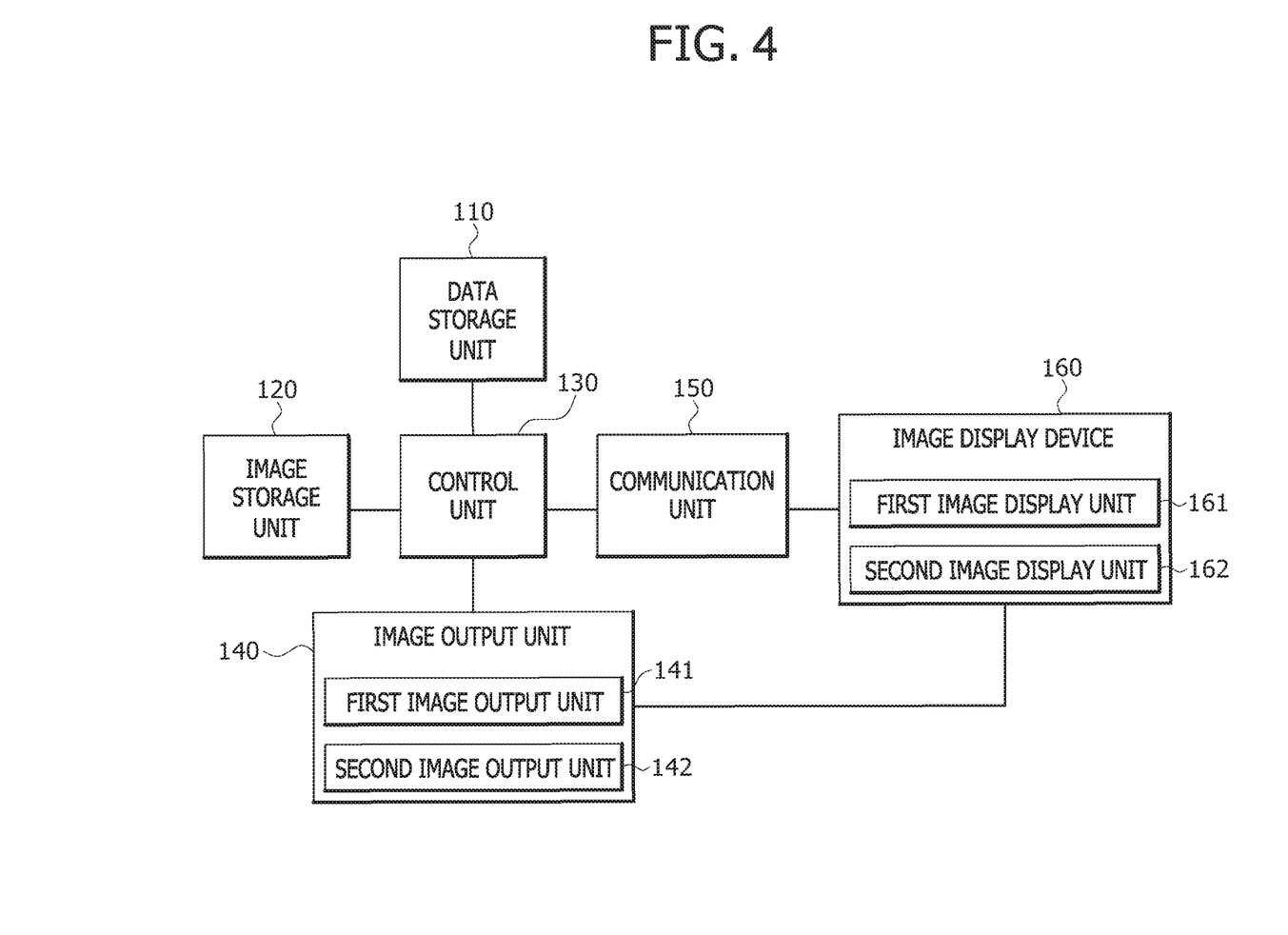
FIG. 4 is an exemplary diagram showing a schematic configuration of an apparatus for controlling an image display device of the slot machine apparatus according to the second embodiment of the present invention.
Figure 5:
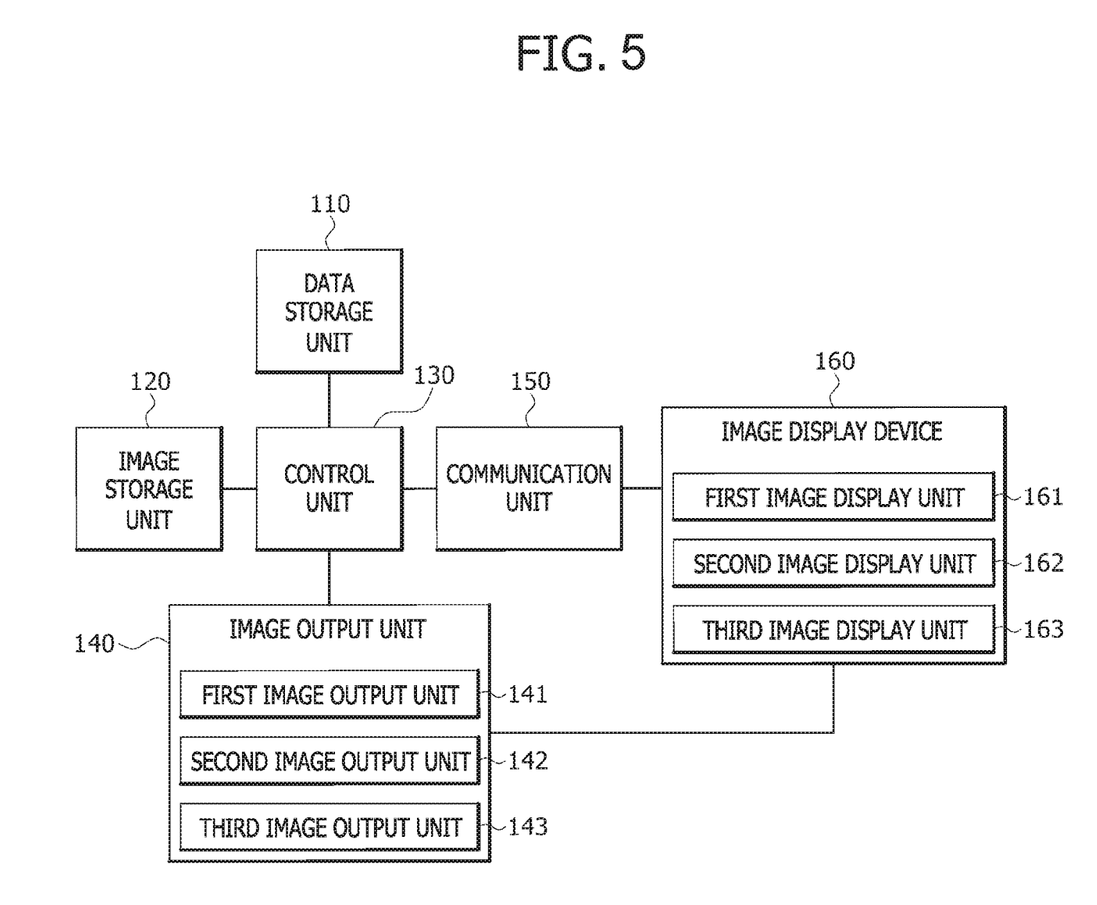
FIG. 5 is an exemplary diagram showing a schematic configuration of an apparatus for controlling an image display device of a slot machine apparatus according to the third embodiment of the present invention.

FIG. 4 is an exemplary diagram showing a schematic configuration of an apparatus for controlling an image display device of the slot machine apparatus according to the second embodiment of the present invention, and FIG. 5 is an exemplary diagram showing a schematic configuration of an apparatus for controlling an image display device of a slot machine apparatus according to the third embodiment of the present invention. FIG. 4 is an exemplary diagram showing that two or more image output units 140 and two or more image display devices 160 are included to correspond to each other, and FIG. 5 is an exemplary diagram showing that three or more image output units 140 and three or more image display devices 160 are included to correspond to each other.

Meanwhile, the communication unit 150 may transmit a control signal for the control unit 130 to control the image display device 160 or may receive information (specification) for image setting from the image display device 160.

The communication unit 150 supports at least one communication specification (e.g., Direct Digital Control (DDC), Inter Integrated Circuit (I2C), Auxiliary (AUX), universal asynchronous receiver/transmitter (UART), and the like).

The control unit 130 may analyze content (or image content) of the image storage unit 120 on a frame or time basis, calculate image setting data in real time to optimize the image quality of the image display device 160 according to the nature or mode of the content, or control the image quality of the image display device 160 using the image setting data stored in the data storage unit 110.

The control unit 130 may read functions and range supportable by the image display device 160 from the image display device 160 through the communication unit 150 and may determine an image setting range for representing an optimized image quality corresponding to the content. As described above, at least one set of image setting data is provided to correspond to the type of the image display device, and thus the control unit 130 may control the image display device to have optimized image quality.

That is, upon a request from the control unit 130, the image display device 160 may deliver information (specification) regarding a function related to the image quality of the image display device itself (i.e., image setting functions such as brightness variation or color reproducibility).

The control unit 130 may control setting values (e.g., low, middle, high, on/off, etc.) of the function related to the image quality of the image display device 160 (i.e., the image setting function) through the communication unit 150.

When one or more image display devices are installed in the slot machine apparatus, the control unit 130 may distinguish the image display devices from one another on the basis of IDs (EDID) which are used to identify the image display devices or image output ports to which the image display devices are connected.

For reference, the image display device 160 may support at least two multi-window functions (e.g., Picture out of Picture (PoP) (i.e., different pieces of content may be output to multiple image display units) and may apply image settings for representing different image quality to windows (i.e., image display units).

In this embodiment, the image content may have discrete modes (e.g., a demo mode, a game mode, an event mode, etc.), and the image display device 160 stores image setting data and a function specific to the type of the image display device in the data storage unit 110 such that optimal image quality may be represented according to each of the modes.

The image setting data (or at least one set of image setting data) may be mapped to correspond to the type of the image display device and the nature or mode of the content. The mapping data (i.e., image setting data or a function of the image display device for representing optimal image quality according to the nature or mode of image content) may be set directly by a content designer (developer) and may be set automatically according to an algorithm or equation pre-designated by the control unit 130. The mapping data may be written in the form of a database.

The nature or mode of the image content is determined according to an external event setting and an internal preset algorithm, and the control unit 130 may output specific content stored in the image storage unit 120 to the image display device 160 through the image output unit 140.

In this embodiment, the following description will focus on automatically setting an image by the control unit 130. However, embodiments of the present invention is not limited thereto, and it should be noted that image setting may be manually performed by a user.

Figure 2:
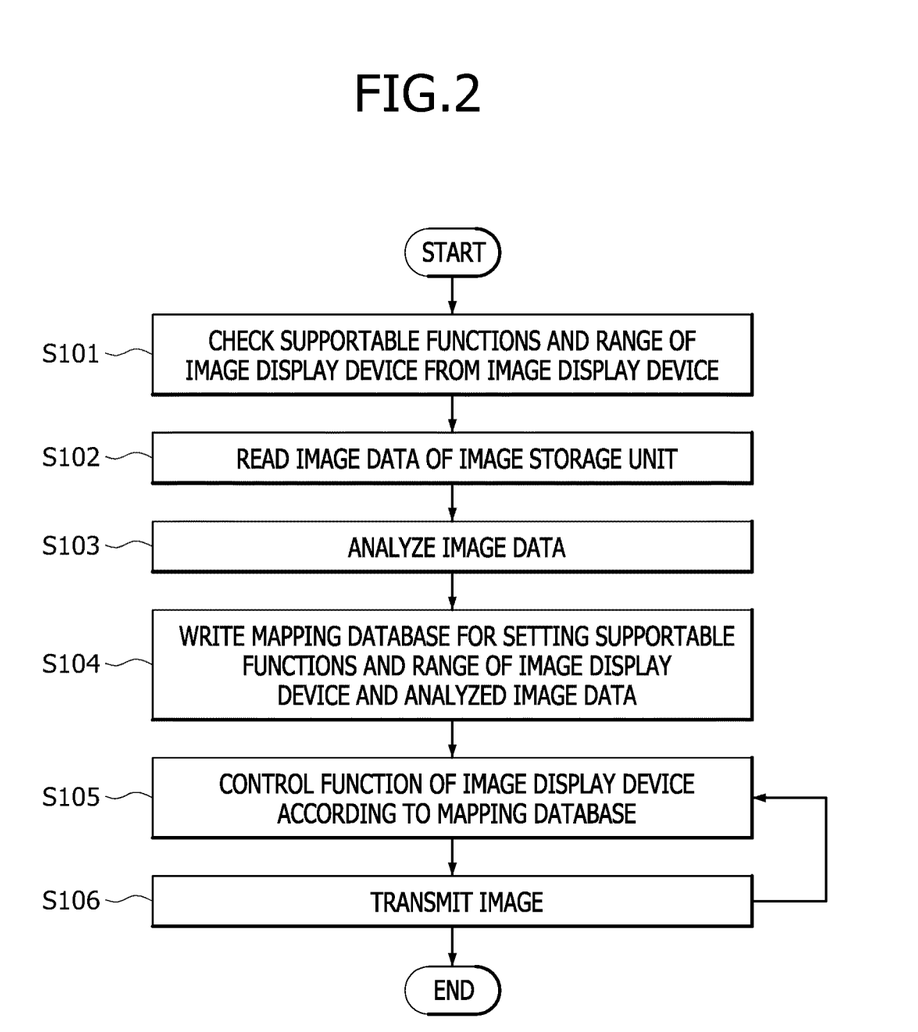
FIG. 2 is a flowchart illustrating an image display method for the slot machine apparatus according to the first embodiment of the present invention.

FIG. 2 is a flowchart illustrating an image display method for the slot machine apparatus according to the first embodiment of the present invention.

Referring to FIG. 2, the control unit 130 checks supportable functions and range of the image display device 160 from the image display device 160 (S101).

That is, the control unit 130 checks an image setting range for controlling the image quality of the image display device 160. This is because the supportable functions and range (image setting range) may vary depending on the type of the image display device 160.

The control unit 130 reads image data (or image content) from the image storage unit 120 (S102). Also, the control unit 130 analyzes the nature or mode of the read image data (or image content) (S103).

Also, the control unit 130 writes a mapping database for setting supportable functions and range (image setting range) of the image display device 160 and the analyzed image data (or image content) (S104).

Also, the control unit 130 controls the functions (or image setting) of the image display device 160 according to the written mapping database (S105).

That is, in order to display the image data (or image content) with optimal image quality through the image display device 160 according to the nature or mode of the image data (or image content) read from the image storage unit 120, the control unit 130 controls the corresponding functions or the image setting according to the written mapping database within functions and a range (image setting range) supportable by the image display device 160.

Thus, the image display device 160 becomes in a state capable of displaying images with optimal image quality according to the nature or mode of the image data (or image content).

Subsequently, the control unit 130 transmits the image data (or image content) to the image display device 160 on which the image setting has been performed (S106).

In this case, operations S105 and S106 are illustrated as being repeatedly performed (i.e., the best image quality is sought by continuously changing image quality data specific to an image through the continuous determination of the image). However, embodiments of the present invention is not limited thereto, and the same image quality may be applied to data that is set once.

Figure 3:
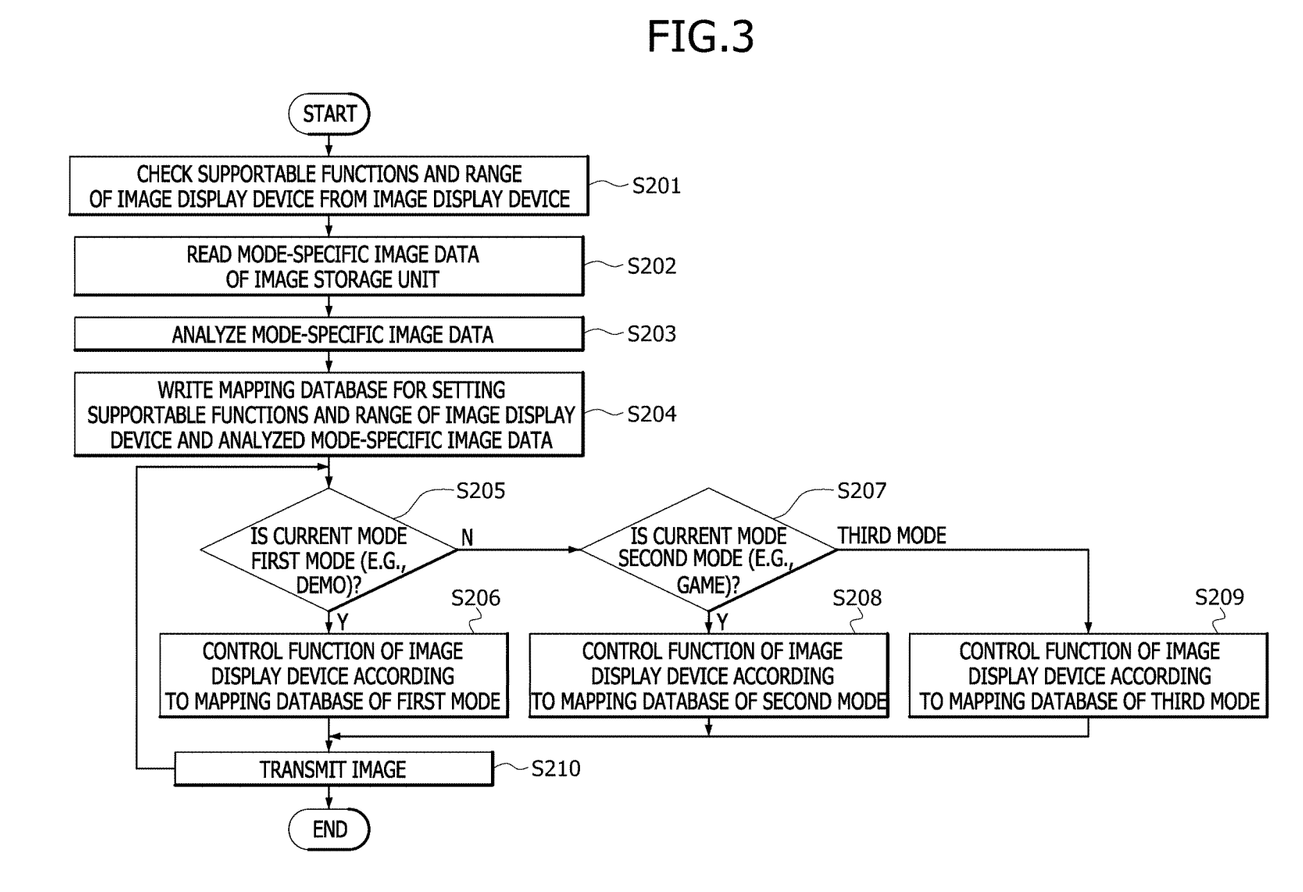
FIG. 3 is a flowchart illustrating an image display method for a slot machine apparatus according to a second embodiment of the present invention.

FIG. 3 is a flowchart illustrating an image display method for a slot machine apparatus according to a second embodiment of the present invention.

Referring to FIG. 3, operations S201 to S204 of FIG. 3 are the same as operations S101 to S104 of FIG. 2, and thus the description of operations S201 to S204 of FIG. 3 will be omitted.

Meanwhile, when the nature or mode of the image data (or image content) is analyzed through operations S201 to S204, the control unit 130 checks whether the current mode is a first mode (e.g., a demo mode). When the current mode is the first mode (yes in S205), the control unit 130 controls the image setting or function of the image display device 160 according to the mapping database set in the first mode and optimizes the image setting or function of the image display device 160 to the image data (or image content) (S206).

Also, when the nature or mode of the image data (or image content) is analyzed through operations S201 to S204, the control unit 130 checks whether the current mode is a second mode (e.g., a demo mode). When the current mode is the second mode (yes in S207), the control unit 130 controls the image setting or function of the image display device 160 according to the mapping database set in the second mode and optimizes the image setting or function of the image display device 160 to the image data (or image content) (S208).

Also, when the nature or mode of the image data (or image content) is a third mode (no in S207), the control unit 130 controls the image setting or function of the image display device 160 according to the mapping database set in the third mode and optimizes the image setting or function of the image display device 160 to the image data (or image content) (S209).

After the functions or image setting of the image display device 160 is optimized according to the nature or mode of the image data (or image content) as described above, the control unit 130 transmits the image data (or image content) (S210).

In this case, operations S205 and S210 are illustrated as being repeatedly performed (i.e., the best image quality is sought according to the current mode by continuously changing image quality data specific to an image through the continuous determination of the image). However, embodiments of the present invention is not limited thereto, and the same image quality may be applied to data that is set once for each mode.

An image setting method may be provided that is for multiple image display devices provided in a slot machine apparatus and that is based on the purpose (the purpose of outputting image content corresponding to a specific function or mode) of each image display device according to an embodiment of the present invention.

When three image display devices are provided in a slot machine apparatus, a dynamic image is displayed on the lowest image display device where an actual game is performed despite the same game mode. Thus, a specific image setting (e.g., overdrive) is set to be high. Also, a static image is displayed on an upper image display device, and a specific image setting (e.g., overdrive) is set to be different from that of the lowest image display device.

A photo may be obtained by capturing a screen with image quality set to high brightness, high color reproducibility, and high sharpness by performing image setting on the image display device according to an event mode of the image content. A photo may be obtained by capturing a screen with image quality set to low brightness, low color reproducibility, low sharpness, and low response speed in order to perform convenient and quick image support by performing image setting on the image display device according to a game mode of the image content.

For reference, content in the event mode is mainly made up of colorful and quick images in order to give a user more immersion, interest, and achievement. Conventionally, since only the configuration or details of the content are changed while an image setting is maintained, the effect of drawing a user's attention is not large. However, as shown in this embodiment, the image setting of the image display device is automatically controlled and adjusted to an optimized image quality corresponding to the content, and thus it is possible to improve the effect desired by the content.

Figure 6:
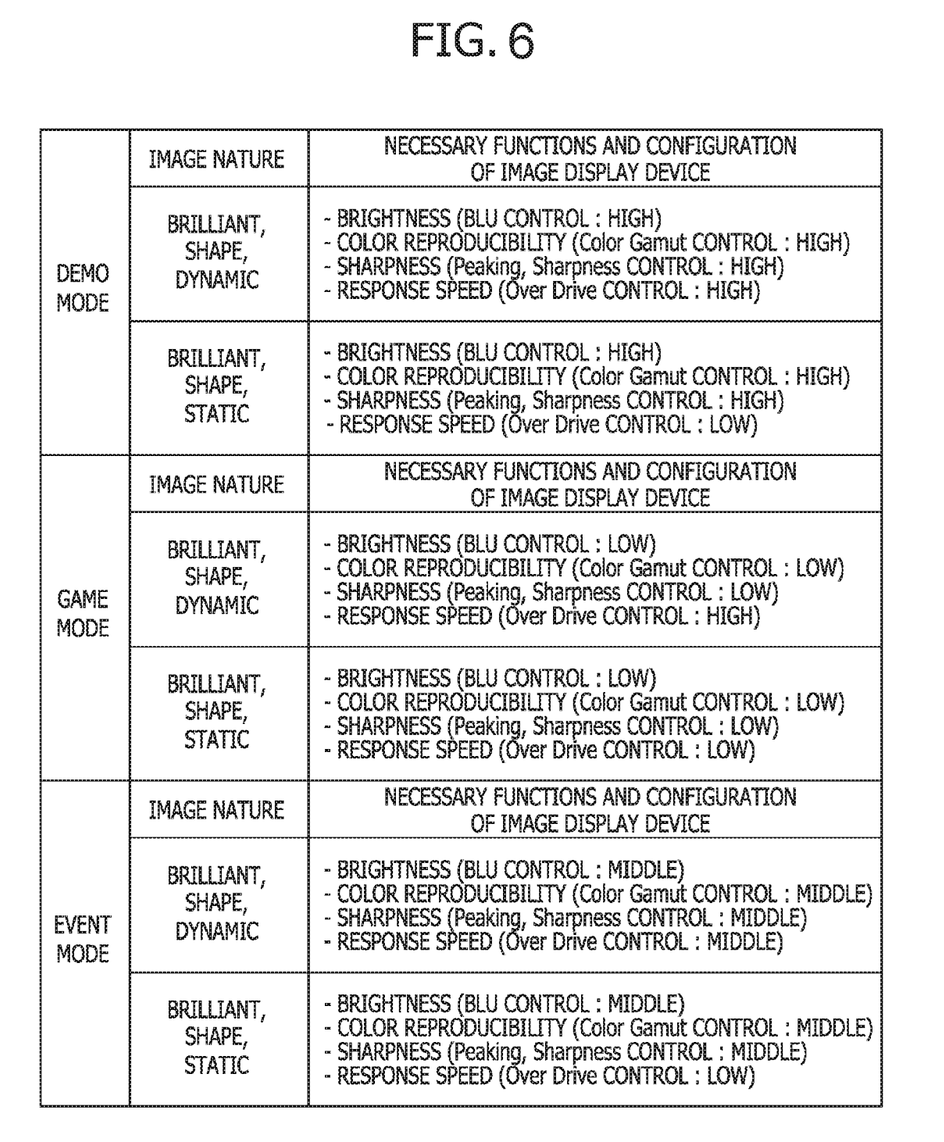
FIG. 6 is an exemplary diagram showing an image setting method or a function of an image display device according to the nature or mode of image content in the form of a table according to an embodiment of the present invention.

For example, in the event mode, as shown in FIG. 6, the effect may be maximized according to the nature of the image content by increasing the output of the light source so that the image display device 160 has the high brightness characteristic and by increasing the color reproducibility range of a scaler, which is reduced in the game mode, increasing the sharpness setting of a scaler, which is reduced in the game mode, and increasing the overdrive setting related to the response speed in the case of quick images so that the image display device 160 has high color reproducibility.

Meanwhile, for the game mode, the output of the light source is reduced in order to allow a user to continuously play a game. This is because the user can easily experience eye fatigue when playing the game for a long time at high brightness. When the output of the light source is reduced as described above, the user may not only play the game for a long time in a more comfortable state but also increase the lifespan of the image display device. Also, the game mode includes quickly moving images such as a reel, and thus by increasing the setting of a function related to the response speed such as overdrive, it is possible to display smoother images.

In this case, this embodiment assumes that the image content has three modes (e.g., a demo mode, a game mode, and an event mode (see FIG. 6). However, it should be noted that more varied mode setting is possible.

Image setting may be performed differently for each of two display regions in one image display device. However, as shown in FIG. 5, image quality may be displayed differently for each piece of image content through different image settings for three or more display regions.

As described above, according to the present embodiment, by automatically controlling the image setting related to the image quality of the image display device according to the nature or mode of the image content output from the slot machine, it is possible to provide a user with more comfortable images, various colorful images, or images with better image quality that are closer to their original images, and it is also possible to extend the lifespan of the image display device.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An apparatus for controlling an image display device of a slot machine apparatus, the apparatus comprising:
   an image storage unit configured to store at least one piece of image content to be displayed on the image display device of the slot machine apparatus;
   a data storage unit configured to store image setting data for optimizing a function of the image display device according to a nature or mode of the image content;
   a control unit configured to output specific image content of the image storage unit to a designated image display device or at least one display region of the image display device through an image output unit and configured to control image setting of the image display device or the at least one display region of the image display device using the image setting data in order to optimize image quality according to the nature or mode of the image content; and
   a communication unit configured to transmit a control signal of the control unit, which controls the image setting of the image display device, to the image display device or configured to deliver specification information for image setting of the image display device to the control unit;
   wherein the control unit is configured to:
      check specification information related to an image setting function and range of an image display device from the image display device;
      read the image content from the image storage unit to analyze the nature or mode; and
      write a mapping database of the image setting data for image setting within the function and range of the image display device and the analyzed image content.

2. The apparatus of claim 1, wherein when the slot machine is equipped with at least one or more image display devices, the control unit identifies the image display devices on the basis of an ID which is used to identify each image display device or an image output port to which each image display device is connected.

3. The apparatus of claim 1, wherein the image display device is implemented to:
   support at least two or more multimedia window functions;
   output a different piece of image content to each window; and
   apply image setting for representing different image quality to each window.

4. The apparatus of claim 1, wherein the data storage unit stores at least one set of image setting data in order to correspond to at least one or more image display devices according to the nature or mode of the same image content.

5. The apparatus of claim 1, wherein the mapping database is a database for the image setting or function of the image display device to represent an optimal image quality according to the nature or mode of the image content.

6. The apparatus of claim 1, wherein the control unit is configured to:
   control the image setting or function of the image display device to optimize image quality according to the image content based on the written mapping database; and
   output the image content to the image display device on which the image setting is performed.

7. The apparatus of claim 1, wherein the control unit is configured to:
   control the image setting or function of the image display device according to a mapping database set in the analyzed mode to optimize the image quality of the image display device according to the image content when the nature or mode of the image content is analyzed; and transmit the image content after optimizing the image quality of the image display device according to the image content.

8. The apparatus of claim 1, wherein the image setting is manually done by a user.

9. A method of controlling an image display device of a slot machine apparatus, the method comprising:
   checking, by a control unit, specification information for image setting of the image display device from the image display device;
   reading, by the control unit, image content from an image storage unit and analyzing a nature or mode of the image content;
   writing, by the control unit, a mapping database of image setting data for image setting within a function and range of the image display device and the analyzed image content;
   controlling, by the control unit, the image setting or function of the image display device to optimize image quality according to the image content based on the written mapping database; and
   outputting, by the control unit, the image content to the image display device on which the image setting is performed;
   wherein the controlling of the image setting or function of the image display device to optimize image quality according to the image content based on the written mapping database comprises controlling, by the control unit, the image setting or function of the image display device to optimize image quality according to the image content based on a mapping database set in the analyzed current mode when the nature or mode of the image content is analyzed.

10. The method of claim 9, wherein the mapping database is a database for the image setting or function of the image display device to represent the optimal image quality according to the nature or mode of the image content.

11. The method of claim 9, wherein the image setting data includes at least one set of image setting data in order to correspond to at least one or more image display devices according to the nature or mode of the same image content.

\* \* \* \* \*